United States Patent
Butterfield et al.

[11] 3,722,618
[45] Mar. 27, 1973

[54] SANDWICH DECK CONSTRUCTION

[75] Inventors: Max E. Butterfield, Peoria; Richard H. Hoerr, East Peoria; Alan L. McLees, Washington; Frederick D. Proksch, Peoria, all of Ill.

[73] Assignee: Caterpillar Tractor Co., Peoria, Ill.

[22] Filed: Dec. 28, 1970

[21] Appl. No.: 101,635

[52] U.S. Cl. .............. 181/33 G, 181/33 A, 181/33 K
[51] Int. Cl. ............................................... F16f 7/00
[58] Field of Search .... 181/33 A, 33 G, 33 GA, 33 R, 181/33 K; 177/189, 253; 180/90, 90.6; 296/1 R, 1 F, 28 F, 28 R, 28 M

[56] References Cited

UNITED STATES PATENTS

| | | | |
|---|---|---|---|
| 2,925,051 | 2/1960 | Van Der Sluys | 181/33 G |
| 2,323,336 | 7/1943 | Knorr | 181/33 GA |
| 2,505,554 | 4/1950 | Kravitz | 180/90.6 X |
| 1,641,602 | 9/1927 | Roberts | 181/33 A |
| 1,737,589 | 12/1929 | Jaspert | 181/33 G |
| 1,738,670 | 12/1929 | Rohrbach | 181/33 G |
| 2,052,984 | 9/1936 | Madison | 181/33 G |
| 2,270,902 | 1/1942 | Rubissow | 181/33 G |
| 2,831,735 | 4/1958 | Bennett et al. | 296/28 M |
| 2,864,647 | 12/1958 | Chesna et al. | 296/28 F |
| 3,071,217 | 1/1963 | Gould | 181/33 G |

FOREIGN PATENTS OR APPLICATIONS

| | | | |
|---|---|---|---|
| 181,202 | 2/1955 | Austria | 296/28 M |
| 1,057,886 | 5/1959 | Germany | 296/28 F |
| 581,207 | 10/1946 | Great Britain | 181/33 G |
| 909,838 | 11/1962 | Great Britain | 181/33 G |
| 648,951 | 11/1962 | Italy | 296/28 M |
| 120,407 | 5/1927 | Switzerland | 296/28 M |

*Primary Examiner*—Richard B. Wilkinson
*Assistant Examiner*—John F. Gonzales
*Attorney*—Fryer, Tjensvold, Feix, Phillips & Lempio

[57] ABSTRACT

A noise and dirt blocking deck construction for an earthmoving machine comprising two rigid layers separated by a layer of resilient material. Each layer comprises multiple sections joined at offset edges to eliminate sound and dirt transmission. Attachment means are used which reduce noise transmission and control deformation of the resilient elements of the construction.

9 Claims, 6 Drawing Figures

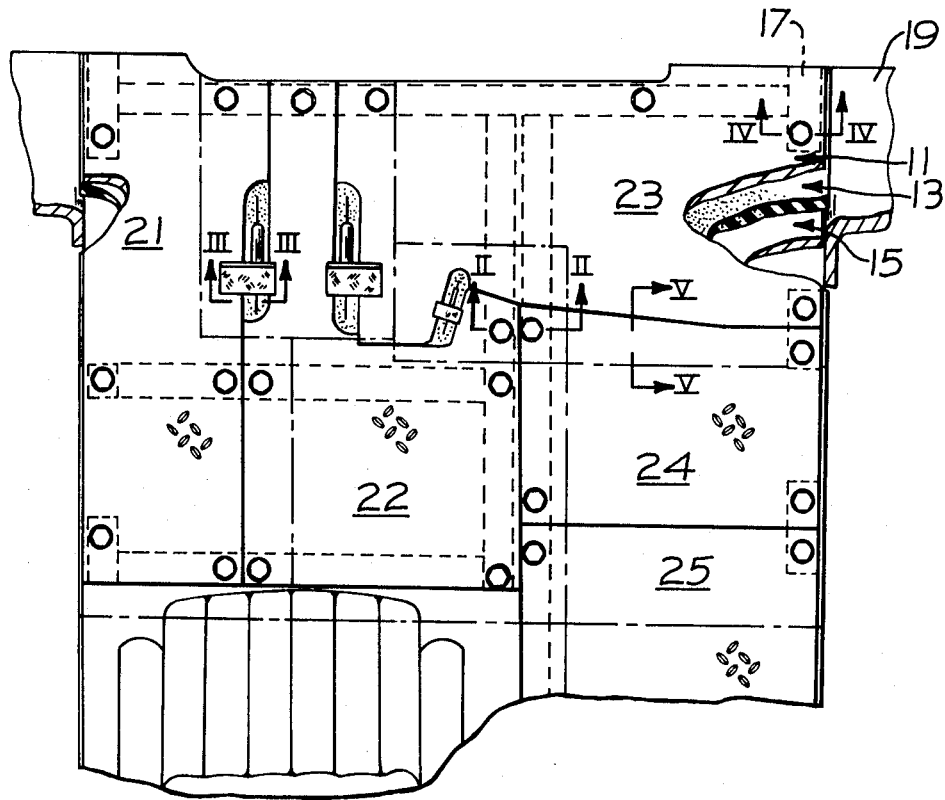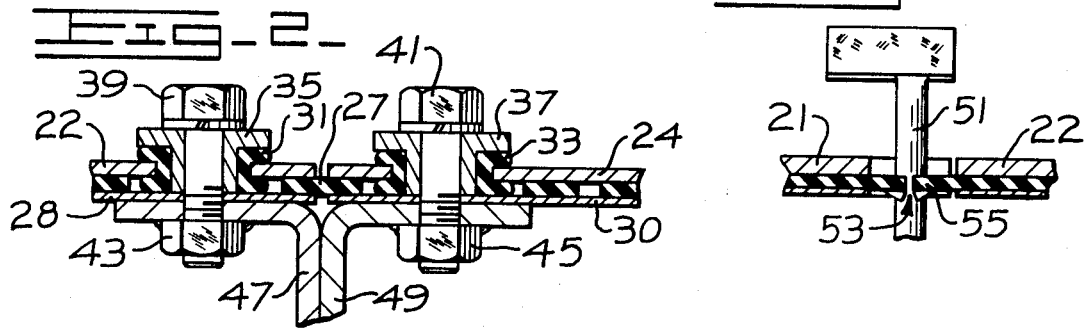

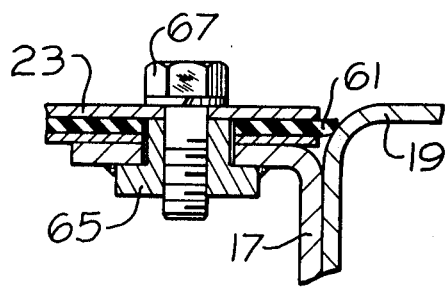
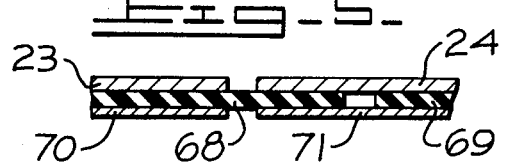
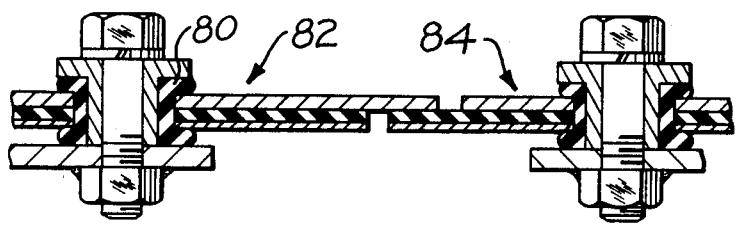
INVENTORS
MAX E. BUTTERFIELD
RICHARD H. HOERR
ALAN L. McLEES
FREDERICK D. PROKSCH
BY
ATTORNEYS

SANDWICH DECK CONSTRUCTION

BACKGROUND OF THE INVENTION

The floor of a conventional earthmoving machine consists of a number of patterned metal plates, easily removed to provide access to control linkages and other integral elements of the machine for servicing purposes. Cracks between adjacent plates in the floor allow the admission of noise and dirt to the operator's station and the impairment of the safety and comfort of the operator.

Pending Federal legislation, applicable to earthmoving machinery, would impose rather stringent limitations upon the noise levels to which operators are exposed. The aforementioned conventional flooring will be unlikely to meet these limitations.

Sandwich-type constructions are presently used for panels and floors in the building trade and in aircraft and other related industries. These constructions are generally sophisticated, relatively expensive, decorative, and of bonded or honeycomb prefabrication. However, such one-piece constructions, if utilized in earthworking equipment, would restrict access to critical service areas and would be unacceptable. Use of multiple sections of such sandwich constructions would result in the noise and dirt transmitting problem discussed above, because of the inability to sealingly join same.

Ancillary to the attenuation of noise and dirt transmission, an important criterion in floor construction is serviceability. In use, the flooring in an earthmoving vehicle may be exposed to severe environmental conditions and heavy loading. Accessory parts such as floor mats and rubber boots around control levers for noise and dirt control have not proven successful over extended periods in most earthmoving vehicle applications.

This invention provides a rugged, low-cost, noise-attenuating floor construction which permits easy access to service elements of the earthmoving machine.

SUMMARY OF THE INVENTION

This invention relates to a sandwich panel construction, particularly adaptable to earthmoving vehicles, which comprises an outer metal layer, a central resilient layer, and an inner metal layer, all arranged to act as a noise transmission barrier.

Commercially available prefabricated sandwich panels do not offer the combined advantages of a rugged working surface, adaptability to environmental demands, low cost, and easy access provided by this construction.

It is an object of this invention to reduce the noise level at earth moving machine operator's station for improved safety and comfort.

It is another object of this invention to construct a noise absorbing floor, or other sound transmitting surface on the machine by arranging a plurality of layers such that sound which is not reflected by an inner hard layer will be transmitted to and absorbed by a centrally disposed resilient layer.

It is yet another object of this invention to eliminate noise transmitting cracks in a deck, or other surface by staggering the adjoining edges of complementary parts in successive layers.

Still another object of the present invention is to eliminate conventional boot means or other protruding, easily damaged accessories that seal around control stems and linkages passing through the deck of an earthmoving vehicle.

Yet another object of the present invention is to provide a means for controlling the deformation of a central resilient layer disposed between two rigid layers and attached to a supporting framework by using a spacer means as an integral part of the attachment means.

Another object of this invention is to provide an attachment means for a deck construction which will not act as a noise transmission element.

Other objects and advantages of this invention will become apparent from the following description and claims.

BRIEF DESCRIPTION OF THE DRAWINGS

FIG. 1 is a partially sectioned plan view of the floor area of a typical earthmoving machine;

FIG. 2 is a sectional view taken in the direction of arrows II—II in FIG. 1, showing attachment of the barrier to the supporting framework;

FIG. 3 is another sectional view of the floor area taken in the direction of arrows III—III in FIG. 1, illustrating a pedal stem penetrating the deck;

FIG. 4 is a section of the floor and fender taken in the direction of arrows IV—IV in FIG. 1;

FIG. 5 is yet another sectional view, illustrating offset joining edges in successive layers of the barrier, and looking in the direction of arrows V—V in FIG. 1.

FIG. 6 is the section of an alternate floor arrangement.

DESCRIPTION OF THE PREFERRED EMBODIMENTS

A section of the deck of an earthmoving machine is shown in the upper right-hand corner of FIG. 1. The deck is generally comprised of three layers containing a plurality of textured floor plates 11, a plurality of resilient center mats 13 made from reclaimed rubber or the like, and a plurality of bottom plates 15. Supporting framework 17 and a side fender 19 are representative of conventional elements found on earthmoving machines.

In the FIG. 1 arrangement, the top layer of the deck comprises five separately removable plates 21, 22, 23, 24 and 25. The resilient center layer consists of seven separately removable mats as shown by phantom lines. The bottom layer 15 comprises five separately removable plates which coincide in shape with said top plates. The outline of the supporting framework is shown by hidden lines.

Disassembly of the deck construction for access to service elements of the machine is accomplished by removing the appropriate attachment volts, lifting off the desired top plate, folding back the resilient center mat, and lifting away the bottom plate. Assembly is simply the reverse of this procedure. Sections of this deck taken at various points will show the specifics of construction.

FIG. 2 is a section through adjacent top floor plates 22 and 24. Resilient center mat 27 spans the otherwise open joint between the adjacent edges of the aforementioned top plates, and also the bottom plates 28 and 30. Grommets 31 and 33 are placed in circular cylindrical bolt-receiving openings in the top plates, thereby isolating said plates from direct contact with the bolts or other attachment devices. Spacers 35 and 37 coact with the plates 28 and 30 and permit bolts 39 and 41 to be tightened into nuts 43 and 45, respectively, only to a limited extent; thus controlling the deformation of the resilient grommets and central layer. Nuts 43 and 45 are welded to supporting framework members 47 and 49, respectively, as an assembly aid since the bolts are normally installed from the top and the nuts are not conveniently accessable for holding purposes.

It should be noted that, although the grommets 31 and 33 in FIG. 2 are shown to encompass only the top plates 22 and 24, respectively, other arrangements are feasible. The grommets could be made to encompass two or more layers of the deck, if so desired. In any case, the amount of deformation on is controlled by the length of spacers used.

FIG. 3 is also a section through adjacent top floor plates 21 and 22 which are relieved to permit operation of control pedal 51. A narrow slot 53 is cut in center resilient layer 55, providing a seal around the stem of the control pedal without inhibiting operation.

FIG. 4 is a section through top plate 23 and fender panel 19. Center resilient layer 61 forms a seal against the fender panel. An alternate attachment method is shown, with threaded spacer 65, welded to supporting frame work 17, providing for a controlled deformation of the center resilient layer when bolt 67 is tightened into the spacer. This attachment method has the advantage of fewer elements than the method outlined with reference to FIG. 2, but it does not provide as satisfactory noise attenuation.

FIG. 5 is another section view showing adjacent top floor plates 23 and 24 and illustrating more clearly how adjoining edges of resilient center mats 68 and 69 are offset from adjoining edges of the top plates and adjoining edges of adjacent bottom plates 70 and 71, to prevent an open passage in the deck.

FIG. 6 illustrates an alternate arrangement of the layers which permits preassembly of multiple sections of the barrier. As mentioned previously, the grommets may encompass all three layers of the deck as shown by the disposition of grommet 80. Grommets mounted in this way hold the three-layered sandwich together as a section subassembly to reduce handling problems as well as to provide at least one metal plate for protection of the resilient layer during handling. In FIG. 6, section 82 would be installed after section 84 to provide a rugged bridge across the gap between said two sections.

While specific application of this construction as a floor is described, it is apparent that other utilizations of this invention are possible, including but not limited to use in a vertical panel arrangement, without departing from the basic spirit of the present invention or the scope of the appended claims.

We claim:

1. In an earthmoving machine having a support framework a noise attenuation construction comprising: a first layer means having a first plurality of plate means juxtaposed within a first plane, a second layer means having a second plurality of plate means juxtaposed within a second plane, a central layer means having a plurality of section means made of resilient sound-absorbing material and disposed between said first and second layer means, and means for attaching said first, second and central layer means to said support framework, said attaching means including bolt and nut means separated by spacer means which spacer means limits the distance between said first and second layer means to control the deformation of said central layer means and said attaching means, whereby noise transmission between said first and second layer means is attenuated by said central layer means.

2. The invention of claim 1 wherein said first plurality of plate means are textured on one side thereof to provide a nonslip surface.

3. The invention of claim 1 wherein said plurality of resilient sound-absorbing section means are made from reclaimed rubber.

4. The invention of claim 1 wherein said first and second plurality of plate means are made from metal.

5. The invention of claim 1 wherein the juxtaposed plate means of said first and second layer means form seams along the lines of juxtaposition between said plate means and wherein said resilient section means overlay and seal off said seams to prevent the transmission of noise and dirt particles therethrough.

6. The invention of claim 1 wherein said attaching means includes resilient grommet sealing mans for the attenuation of noise transmission between the components of said attaching means, said layer means and said support framework.

7. The invention of claim 1 wherein said earthmoving machine has control elements which penetrate said nose attenuation construction and wherein said resilient section means contain narrow openings to accommodate and seal around said control elements.

8. A method of assembling a multi-layered surface construction for an earthmoving machine which comprises the steps of;
   a. placing a first plurality of metal plates upon the supporting framework of said earthmoving machine
   b. placing a second plurality of resilient sections upon said first plurality of metal plates in offset relation thereto, and
   c. placing a third plurality of metal plates upon said second plurality of resilient sections in matching alignment with said first plurality of metal plates.

9. The method of claim 9 further comprising the steps of;
   d. placing attachment means successively through said third plurality of plates, said second plurality of sections, said first plurality of plates and said supporting framework, and
   e. tightening said attachment means to rigidly connect said first, second and third plurality of elements to said framework.

* * * * *